(12) United States Patent
Huang et al.

(10) Patent No.: US 12,285,935 B2
(45) Date of Patent: Apr. 29, 2025

(54) AUTOMATIC PRESSURE HEAT TRANSFER PRINTING MACHINE

(71) Applicant: HUNAN SIJIU TECHNOLOGY CO., LTD, Changsha (CN)

(72) Inventors: Wenxiong Huang, Huazhou (CN); Min Ai, Changde (CN); Bangxing Xie, Changsha (CN)

(73) Assignee: HUNAN SIJIU TECHNOLOGY CO., LTD, Changsha (CN)

( * ) Notice: Subject to any disclaimer, the term of this patent is extended or adjusted under 35 U.S.C. 154(b) by 188 days.

(21) Appl. No.: 18/218,171

(22) Filed: Jul. 5, 2023

(65) Prior Publication Data
US 2024/0009990 A1 Jan. 11, 2024

(30) Foreign Application Priority Data
Jul. 7, 2022 (CN) .......................... 202210795209.6

(51) Int. Cl.
*B41F 16/00* (2006.01)
*B41F 33/00* (2006.01)

(52) U.S. Cl.
CPC .......... *B41F 16/0046* (2013.01); *B41F 16/00* (2013.01); *B41F 16/0093* (2013.01); *B41F 33/00* (2013.01); *B41F 33/0018* (2013.01); *B41P 2219/12* (2013.01); *B41P 2219/13* (2013.01); *B41P 2219/31* (2013.01); *B41P 2219/33* (2013.01); *Y02B 30/00* (2013.01)

(58) Field of Classification Search
CPC .. B41F 16/0046; B41F 16/00; B41F 16/0093; B41F 33/00; B41F 33/0018; B41P 2219/12; B41P 2219/13; B41P 2219/31; B41P 2219/33; Y02B 30/00
See application file for complete search history.

(56) References Cited

U.S. PATENT DOCUMENTS

2018/0141328 A1* 5/2018 Chen ................... B41F 16/0046
2020/0324542 A1* 10/2020 Lin ........................ B30B 15/04

* cited by examiner

*Primary Examiner* — Henok D Legesse
(74) *Attorney, Agent, or Firm* — Birchwood IP

(57) ABSTRACT

An automatic pressure heat transfer printing machine, comprising: a machine body, a drive mechanism, a heat pressing plate component, a supporting seat, and a heat dissipation mechanism; the machine body comprises: a metal bracket and a shell cover, the heat dissipation mechanism comprises: a first heat dissipation channel enclosed by a lower surrounding wall and an upper surrounding wall, the first heat dissipation channel communicates with inside of the heat pressing plate component; a second heat dissipation channel formed inside an upper shell and communicating with the first heat dissipation channel and a heat dissipation outlet; a fan arranged in the second heat dissipation channel for generating heat dissipation airflow. Since the heat pressing plate component adopts plastic shell parts, the heat accumulation effect is avoided. The heat dissipation mechanism is provided to actively dissipate heat inside the plastic shell.

10 Claims, 16 Drawing Sheets

AUTOMATIC PRESSURE HEAT TRANSFER PRINTING MACHINE

CROSS-REFERENCE TO RELATED APPLICATIONS

This application claims the benefit and priority of Chinese patent application No. 202210795209.6, filed on Jul. 7, 2022, disclosure of which is hereby incorporated by reference in its entirety.

TECHNICAL FIELD

The present application relates to the technical field of heat transfer printing equipment, in particular to an automatic pressure heat transfer printing machine.

BACKGROUND

Existing automatic pressure heat transfer machines generally comprise a machine body, a base, a bracket and a heat pressing plate component, a supporting seat is arranged on the base, a drive device is arranged on the machine body, to drive the heat pressing plate component up and down to realize the heat transfer operation on the objects placed on the bracket.

In the existing automatic pressure heat transfer machine, the heat pressing plate component comprises a heat plate and a shell. Due to the high temperature of the heat plate during operation, the temperature on the surface of the shell is high. Most of the shells are made of metal materials, and the improvement space is limited. Metal materials have a heat accumulation effect, which can easily cause burns to the human body.

SUMMARY

The purpose of the present application is to solve the following technical problems, that is, due to the high working temperature of the heating plate of the existing automatic pressure heat transfer machine, the shell can only be made of metal materials, the d improvement space is limited, and the metal material has heat accumulation effect, which is easy to cause harm to the human body. This technical problem is solved by disposing an active heat dissipation mechanism on the heat pressing plate component and the machine body.

An automatic pressure heat transfer printing machine comprising: a machine body, comprising a metal bracket and a shell cover, the metal bracket comprises: an upper bracket and a lower bracket arranged up and down at intervals, and a side bracket connecting the same side end of the upper bracket and the lower bracket; the shell cover comprises an upper shell enclosing the upper bracket, a lower shell enclosing the lower bracket, and a side shell enclosing the side bracket; a drive mechanism, comprising a drive speed change device arranged on the upper bracket, and a screw nut pair extending downwards, an upper end of the screw nut pair is in transmission connection with an output end of the drive speed change device; a heat pressing plate component, arranged under the upper shell, comprising a plastic shell, a connecting member, an electric heating plate component and a plurality of elastic connecting devices, a middle part of the connecting member is fixedly connected with a screw nut of the screw nut pair, and the connecting member is connected with the electric heating plate component by the plurality of elastic connecting devices; the plastic shell encloses an upper part of the electric heating plate component, and an upper side of the plastic shell is provided with a lower surrounding wall surrounding outside of the connecting member, and a lower side of the upper shell is provided with an upper surrounding wall that is movably fitted with the lower surrounding wall; a supporting seat, supported on the lower bracket, is configured to provide support for a heat transfer object; a heat dissipation mechanism, comprising: a first heat dissipation channel enclosed by the lower surrounding wall and the upper surrounding wall, the first heat dissipation channel communicates with inside of the heat pressing plate component; a second heat dissipation channel formed inside the upper shell and connected to the first heat dissipation channel; a fan arranged in the second heat dissipation channel for generating heat dissipation airflow.

Since the eat pressing plate component adopts plastic shell, the heat accumulation effect is avoided. The heat dissipation mechanism can quickly and actively dissipate the heat accumulated inside the eat pressing plate component, which can effectively reduce the temperature of the outer surface of the plastic shell and the upper shell, and avoid scalding the human body. By designing the machine body as a metal bracket and shell cover, the drive mechanism and supporting seat are connected to the metal bracket, and the weight and force of the drive mechanism and supporting are applied to the metal bracket. The shell cover plays an aesthetic and protective role. The material of the shell cover has a large selection space. Under the condition of ensuring the structural strength, it can effectively reduce the weight and volume of the machine body and reduce the cost; The shell cover can be made of general shell industrial materials, which makes the appearance design space of the product larger.

Preferably, it further comprises a heat dissipation outlet communicating with the second heat dissipation channel, and the fan is arranged at a heat dissipation outlet. With the above-mentioned structure, the second heat dissipation channel can directly use the inner space of the upper shell, and a flowing air flow can be formed without additional independent channels.

Preferably, the heat dissipation outlet is arranged on the lower side of the upper shell near the end of the side shell, and the heat dissipation outlet is arranged at the above position, which has good concealment and does not affect the appearance of the product.

Preferably, a main control board is arranged inside the side shell, and a control panel is arranged at a front end of the upper shell and is electrically connected with the main control board. Using the above solution, placing the main control board inside the side shell can avoid the temperature transferred from the electric heating plate component from the first heat dissipation channel, and reduce the influence of temperature on the main control board. The control panel is arranged at the front end of the upper shell at a relative distance from the first heat dissipation channel, and the influence of temperature is small.

Preferably, the second heat dissipation channel forms a communication port at bottom of the upper shell to communicate with the first heat dissipation channel, and a deflector facing the heat dissipation outlet is arranged at the communication port. The deflector is more favorable for the cooling airflow to flow to the heat dissipation outlet.

Preferably, the electric heating plate component comprises a heat-generating base, a non-metallic base cover connected to an upper side of the heat-generating base, at least one layer of heat insulating material arranged between the non-metallic base cover and the heat-generating base, and an edge of the non-metallic base cover is extended to form an edge of the heat-generating base, and an edge of the plastic shell is connected to the edge of the non-metallic base cover. With the above structure, the heat insulation effect of the electric heating plate component can be improved, and the temperature of the plastic shell can be lowered.

Preferably, the plastic shell part is provided with a surrounding wall connecting groove, the lower end of the lower surrounding wall is fitly connected in the surrounding wall connecting groove, and the upper surrounding wall is embedded in the inside of the lower surrounding wall. With this structure, the joint end of the lower surrounding wall and the upper surrounding wall is not easy to see during use, which makes the product more aesthetically pleasing, and foreign matter is not easy to enter between the lower surrounding wall and the upper surrounding wall.

Preferably, the lower surrounding wall is connected with the surrounding wall connecting groove by a buckle structure. With this structure, the connecting structure is reduced, and the assembly and disassembly are convenient.

Preferably, the upper bracket comprises two upper supporting arms arranged side by side at intervals and a driving mounting part, the driving mounting part connects the two upper supporting arms, and the drive speed change device is arranged on the driving mounting part. With this structure, the weight of the upper bracket can be reduced, and the structural rigidity can be ensured, and also the material cost can be reduced.

Preferably, the side bracket comprises two side columns arranged at intervals, one end of each upper supporting arm is connected to an upper end of a corresponding side column, and a lower end of each side column is connected to the lower bracket. With this structure, the weight of the side column can be reduced, and the structural rigidity can be ensured, and also the material cost can be reduced.

Preferably, the connection between one end of the upper supporting arm and the upper end of the corresponding side column comprises at least one of the following:
  a triangular supporting connector connecting a lower side of one end of each upper support arm with an inner side of the upper end of the corresponding side column;
  corner connectors, a length of which is adapted to a distance between the upper ends of the two side columns, and the two ends of the corner connectors respectively enclose and connect the upper side of one end of each upper supporting arm and the outer side of the upper end of the corresponding side column; or, two corner connectors are provided, which cover and connect the upper side of one end of each upper supporting arm and the outer side of the upper end of the corresponding side column;
  two cable-stayed members, one end of the cable-stayed member is connected to the upper end of the side column at a preset height downward, and the other end is connected to a position more than ⅓ from an inner end of the upper supporting arm.

Preferably, the lower bracket comprises a supporting surface, supporting side walls extending downward from at least two opposite sides of the supporting surface, and a supporting connecting part formed at a lower end of the supporting side wall and connected to a bottom wall of the lower shell; the supporting surface is provided with column sockets corresponding to the lower ends of the two side columns, and the lower ends of the two side columns are inserted into the corresponding column sockets with limited angular fit and fixedly connected with the lower bracket. The lower bracket adopts the above structure, which can reduce the weight of the material while ensuring the structural strength. At the same time, the space formed under the supporting surface is reasonably used to provide a space for the connection of the lower ends of the two side columns, making the product structure more compact. The installation of the side columns is quick and easy.

Preferably, the lower side of the column socket is provided with a lateral limit structure for laterally limiting the lower end of the side column, and also comprises one of the following reinforcement structures: a reinforcing bar, connected between the lateral limit structure of the two column sockets and the supporting side wall; a reinforcing bar, connected between the lateral limit structures of the two column sockets; a reinforcing bar, connected between the two supporting side walls.

Using the above reinforced structure can further effectively improve the structural stability of the lower bracket and the stability of the connection between the lower bracket and the two side columns.

DETAILED DESCRIPTION

Referring to FIGS. 1 to 14, the automatic pressure heat transfer machine comprises a machine body 1, a drive mechanism m, a heat pressing plate component H and a supporting seat 3; the machine body 1 comprises a metal bracket 1a and a shell cover 1b, and the metal bracket 1a comprises: an upper bracket 1a1 and a lower bracket 1a2 arranged up and down at intervals, and a side bracket 1a3 connecting the same side end of the upper bracket 1a1 and the lower bracket 1a2; the shell cover 1b comprises an upper shell 1b1 enclosing the upper bracket 1a1, a lower shell 1b2 enclosing the lower bracket 1a2, and a side shell 1b3 enclosing the side bracket 1a3; the drive mechanism m comprises a drive speed change device arranged on the upper bracket 1a1, and a screw nut pair R extending downwards, an upper end of the screw nut pair R is in transmission connection with an output end of the drive speed change device. Arranged on the upper bracket 1a1; the heat pressing plate component H is arranged under the upper shell 1b1 and is driven by the drive mechanism to move up and down, the middle part of the heat pressing plate component H is provided with an escape channel R0 for the screw rod; the supporting seat 3 is supported on the lower bracket 1a2, and is used to provide support for heat transfer objects.

Referring to FIG. 2, FIG. 7, FIG. 13 and FIG. 14, the drive speed change device comprises a motor m1, a reduction gear m2 and a transmission gear member m3. The upper end of the screw rod R1 is fixedly connected with the middle part of the reduction gear m2; The heat pressing plate component H is arranged in the middle of the lower part of the upper bracket 1a1 and is fixedly connected with the nut R2, and is driven by the screw rod R1 to move up and down. By using the screw nut pair R to drive the heat pressing plate component H up and down, the drive mechanism m is installed on the upper bracket 1a1 and located in the upper shell 1b1, and the screw rob R1 is fixed vertically, so that the volume and weight of the product are reduced and the cost is reduced, reduce.

Figure 1:
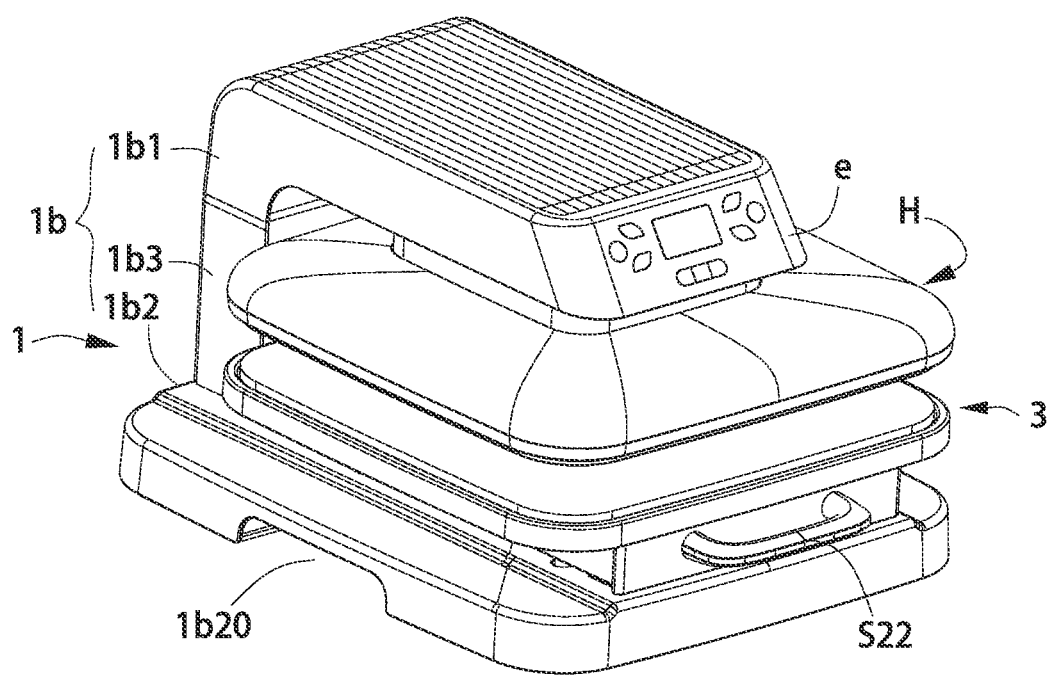
FIG. 1 is a three-dimensional schematic diagram of an automatic pressure heat transfer machine.
Figure 2:
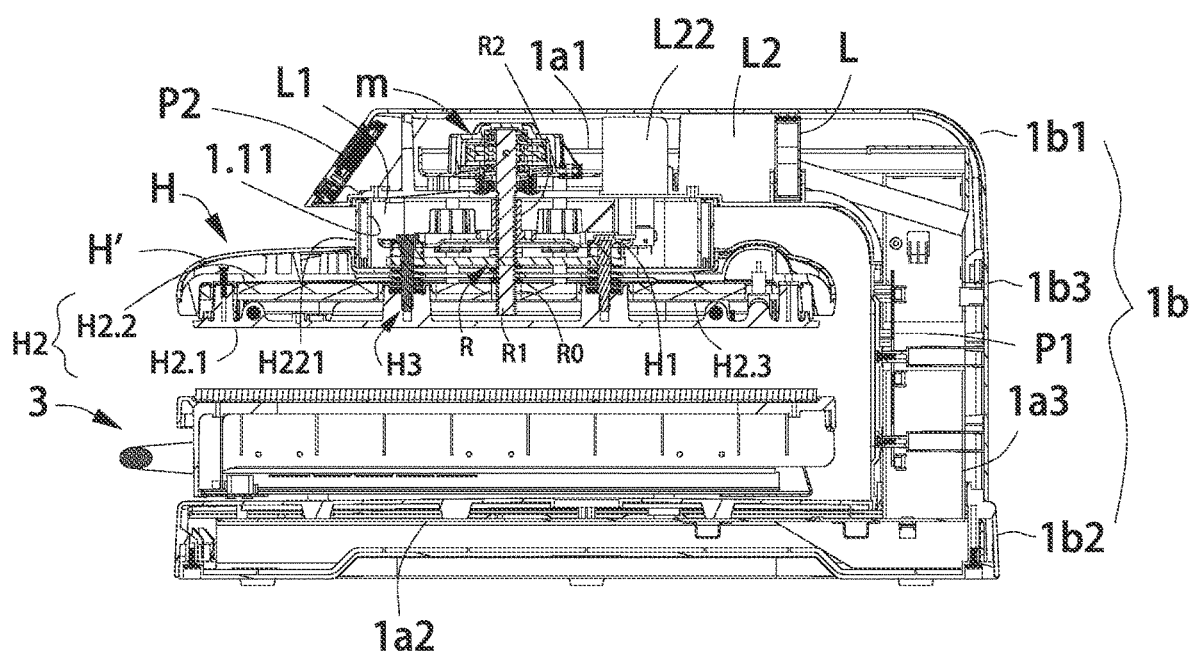
FIG. 2 is a right sectional view of the automatic pressure heat transfer machine.
Figure 3:
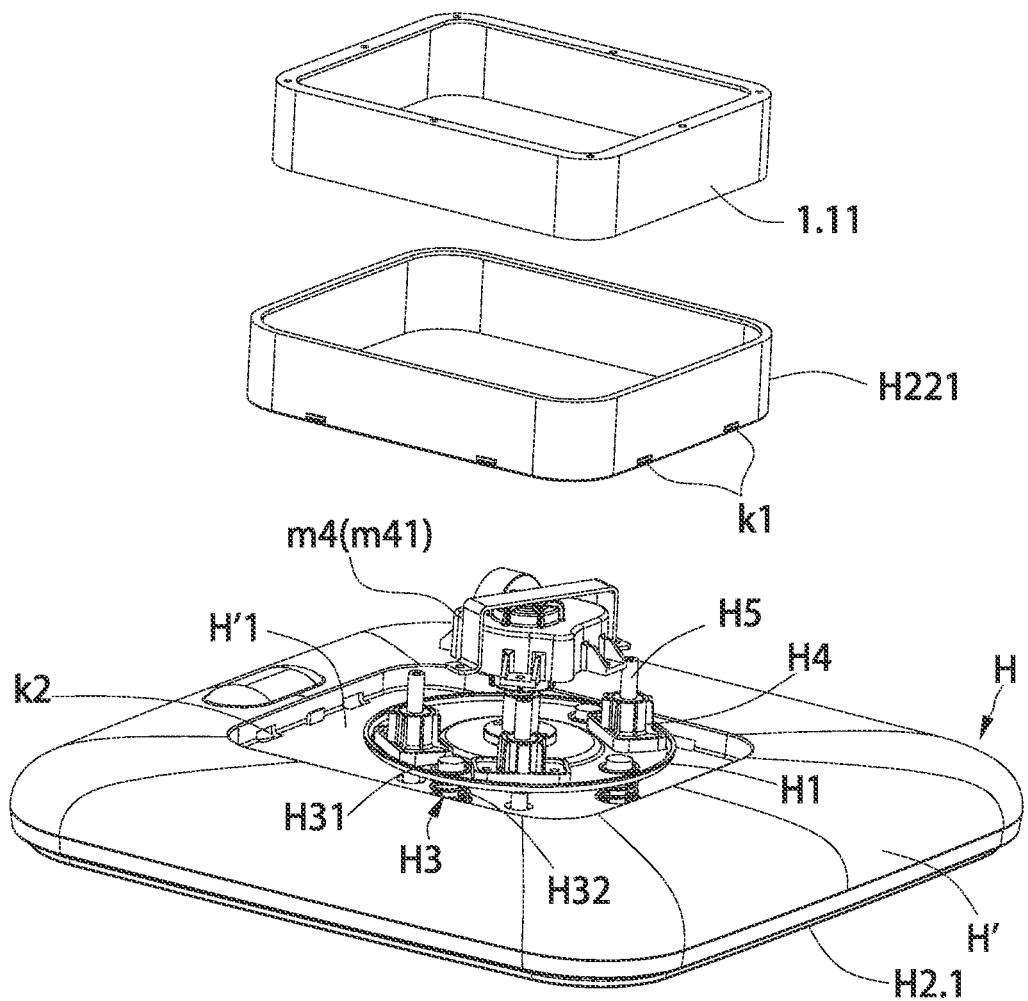
FIG. 3 is an exploded view of the heat pressing plate component and the upper surrounding wall.
Figure 6:
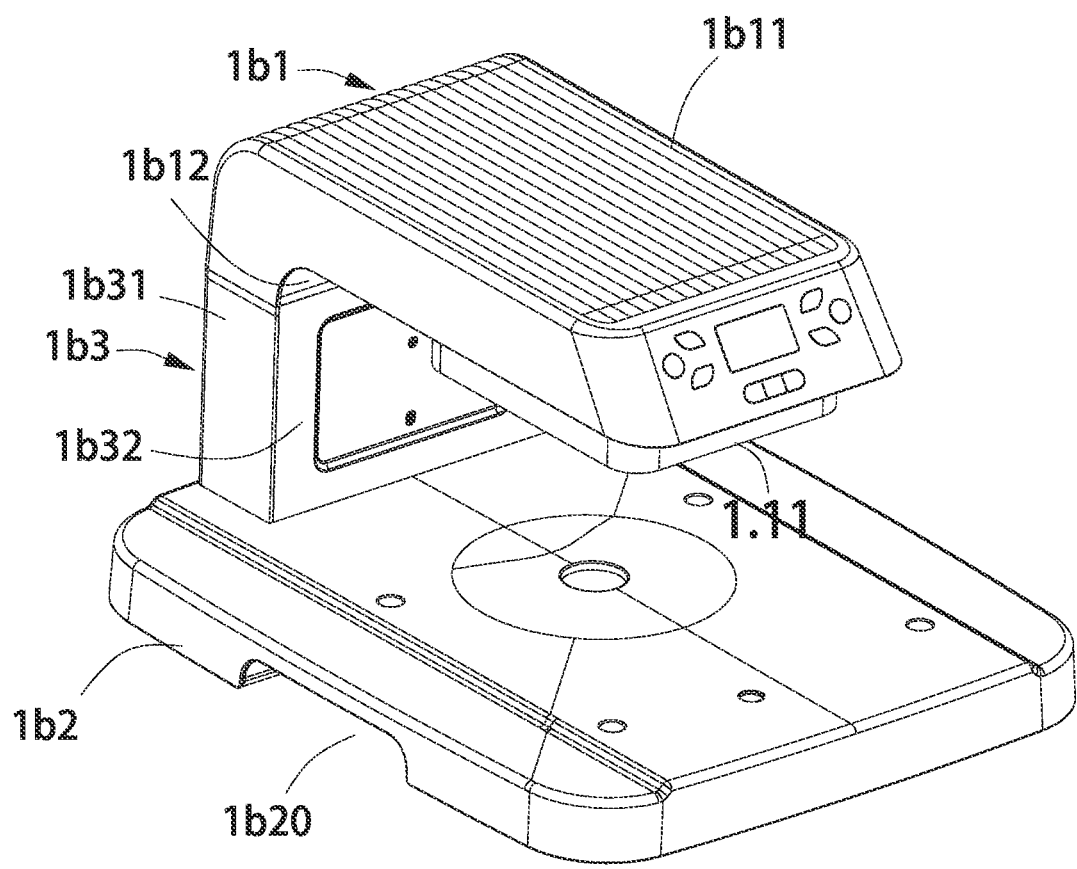
FIG. 6 is a schematic perspective view of the shell cover.

Referring to FIG. 2, FIG. 3 and FIG. 6, the heat pressing plate component H is arranged under the upper shell 1b1 and comprises a plastic shell H', a connecting member H1, an electric heating plate component H2 and a plurality of elastic connecting devices H3, a middle part of the connecting member H1 is fixedly connected with a screw nut R2 of the screw nut pair R, and the connecting member H1 is connected with the electric heating plate component H2 by the plurality of elastic connecting devices 113; the plastic shell H' encloses an upper part of the electric heating plate component H2, and an upper side of the plastic shell H' is provided with a lower surrounding wall H221 surrounding outside of the connecting member H, and a lower side of the upper shell 1b1 is provided with an upper surrounding wall 1.11 that is movably fitted with the lower surrounding wall H221.

By configuring the movable fitting lower surrounding wall H221 and the upper surrounding wall 1.11, the heat pressing plate component H and the screw nut pair R are hidden, so that the appearance of the product is better integrated and more beautiful.

Referring to FIG. 2, the electric heating plate component H2 comprises a heat-generating base H2.1, a non-metallic base cover H2.2 connected to an upper side of the heat-generating base H2.1, at least one layer of heat insulating material H2.3 arranged between the non-metallic base cover H2.2 and the heat-generating base H2.1, and an edge of the non-metallic base cover H2.2 is extended to form an edge of the heat-generating base H2.1, and an edge of the plastic shell H' is connected to the edge of the non-metallic base cover H2.2. By adopting the above structure, the heat insulation effect of the electric heating plate component H2 can be improved, and the temperature of the plastic shell H' can be lowered. In order to improve the heat insulation effect, a heat dissipation gap is provided between the plastic shell H' and the non-metallic base cover H2.2.

Referring to FIG. 2, a connection scheme of the upper surrounding wall 1.11, the top of the upper surrounding wall 1.11 is provided with a connecting hole, and the connecting hole of the upper surrounding wall 1.11 is connected with the upper support 1.1 by screws.

Referring to FIG. 2 and FIG. 3, the connecting member H1 is provided with more than two guide seats H4, and the upper bracket 1a1 is correspondingly provided with a guide rod H5 that cooperates with the guide seat H4. In addition to playing a guiding role, the guide rod H5 and the guide seat H4 can also play an angular positioning role for the connecting member H1.

Referring to FIG. 2 and FIG. 3, the elastic connecting device H3 comprises a connecting piece H31 and an elastic piece H32, the lower end of the connecting piece H31 is fixedly connected with the heating base H2. The piece H32 is sheathed outside the connecting piece H31 and acts elastically between the connecting member H1 and the heating plate component H2, preferably the lower end acts on the heat-generating base H2.1. In this embodiment, the connecting piece H31 is a stud, the connecting member H1 is provided with a connecting hole, the stud can move through the connecting hole and screwed to the heat-generating base H2.1, and the elastic member H32 is a spring. The plastic shell H, the non-metal base cover H2.2, and the heat insulating material H2.3 are provided with avoidance holes corresponding to the elastic connecting device H3.

Figure 5:
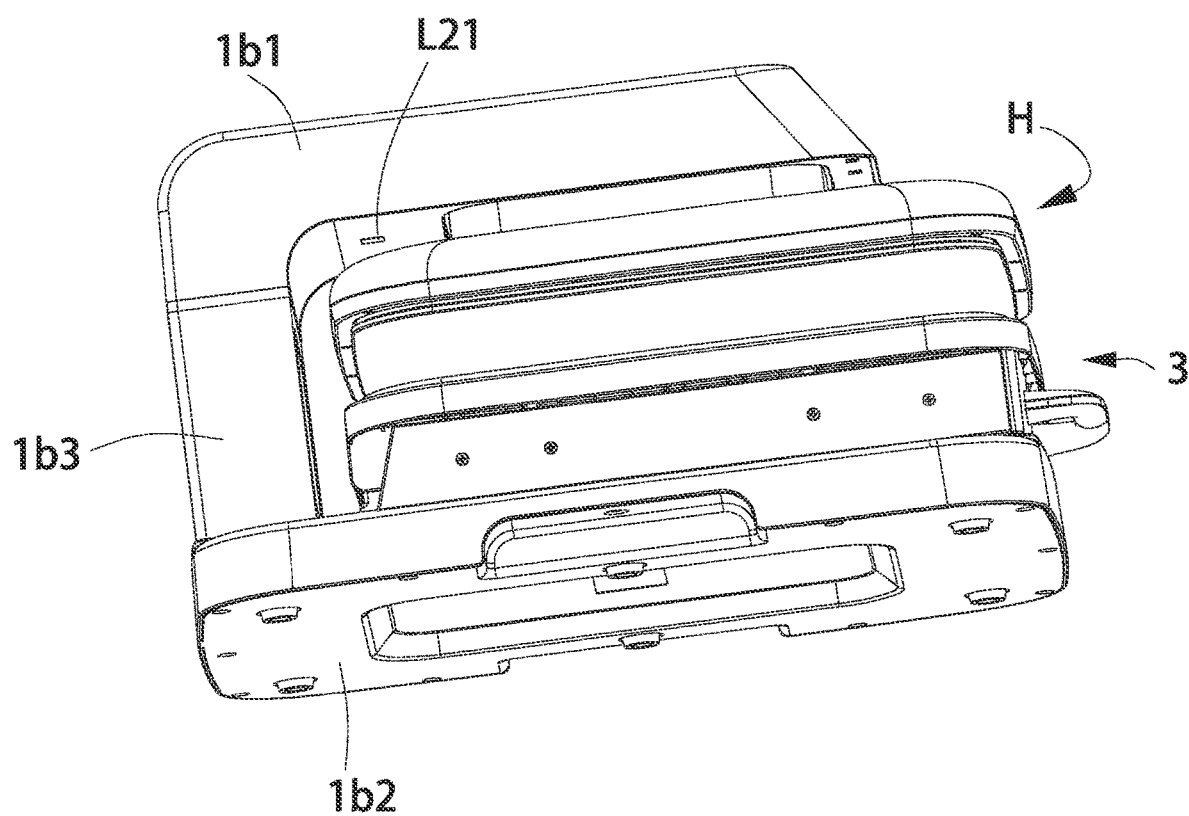
FIG. 5 is a schematic bottom view of the automatic pressure heat transfer machine.

Referring to FIG. 2 and FIG. 5, the heat dissipation mechanism comprises: a first heat dissipation channel L1 enclosed by the lower surrounding wall H221 and the upper surrounding wall 1.11, the first heat dissipation channel L1 communicates with inside of the heat pressing plate component H; a second heat dissipation channel L2 formed inside the upper shell 1b1 and connected to the first heat dissipation channel L1; a fan L arranged in the second heat dissipation channel L2 for generating heat dissipation airflow. The first heat dissipation channel L1 communicates with the inside of the heat pressing plate component H, including an escape channel R0 for the screw rod, an escape hole for the elastic connecting device H3, and the like. Of course, some connection channels can also be processed, but the upper channel is enough, because the heat flows upward.

Since the heat pressing plate component H adopts plastic shell parts H', the heat accumulation effect is avoided. The heat dissipation mechanism is provided to actively dissipate heat inside the plastic shell, which can effectively reduce the temperature on the surface of the plastic shell and avoid scalding the human body. By designing the machine body 1 as a metal bracket 1a and shell cover 1b, the drive mechanism m and supporting seat 3 are connected to the metal bracket, and the weight and force of the drive mechanism and supporting are applied to the metal bracket 1a. The shell cover 1b plays an aesthetic and protective role. The material of the shell cover 1 has a large selection space. Under the condition of ensuring the structural strength, it can effectively reduce the weight and volume of the machine body 1 and reduce the cost; The shell cover can be made of general shell industrial materials, which makes the appearance design space of the product larger.

Referring to FIG. 2 and FIG. 5, the upper shell 1b1 is provided with a heat dissipation outlet L21 communicating with the second heat dissipation channel L2. With the above-mentioned structure, the second heat dissipation channel can directly use the inner space of the upper shell, and a flowing air flow can be formed without additional independent channels. Preferably, a mounting seat L20 is provided on the upper side of the heat dissipation outlet L21, and the fan L is sheathed in the mounting seat L20.

Of course, the heat dissipation outlet L21 may not be provided, and the assembly gap of the upper shell 1b1 may be used to realize air flow; or the internal space of the side shell 1b3 may be used to guide flow and dissipate heat.

However, the optimal solution is to discharge directly from the heat dissipation outlet L21.

The heat dissipation outlet L21 is arranged on the lower side of the upper shell 1b1 near the end of the side shell 1b3, and the heat dissipation outlet L21 is arranged at the above position, which has good concealment and does not affect the appearance of the product.

Figure 4:
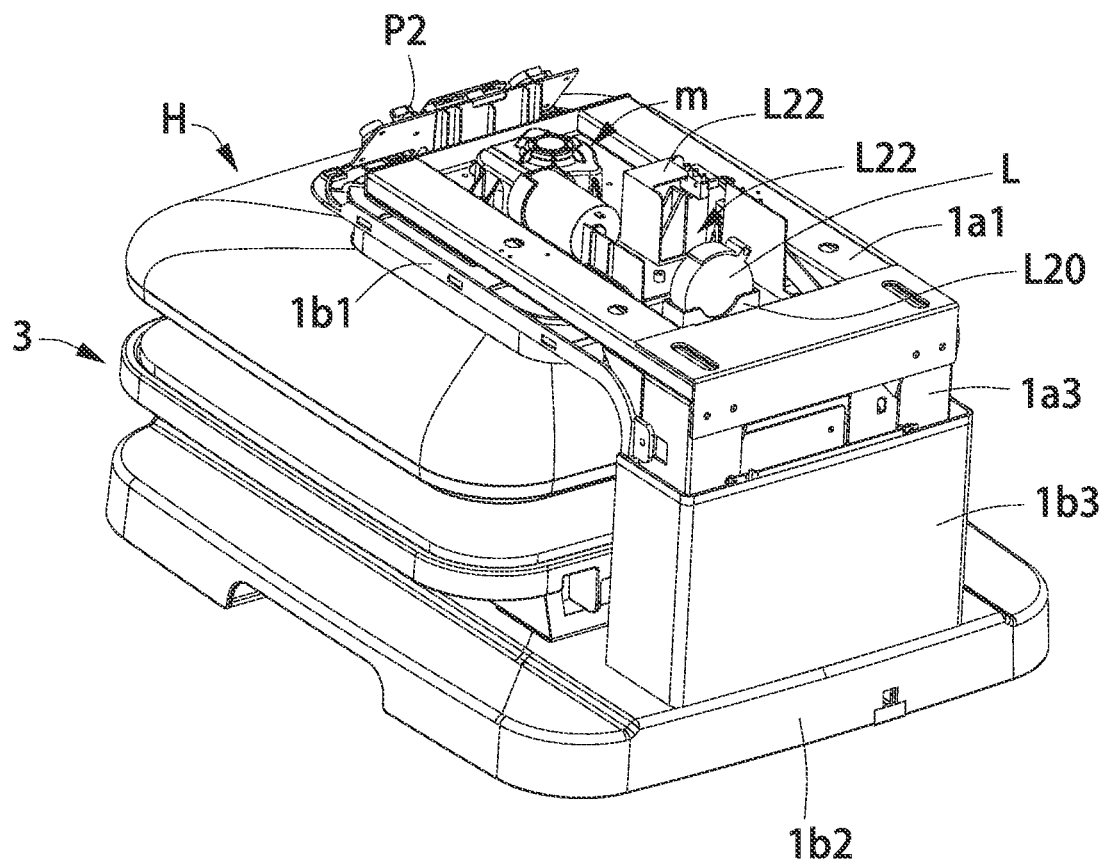
FIG. 4 is a three-dimensional schematic diagram of the automatic pressure heat transfer machine after removing the upper shell.
Figure 7:
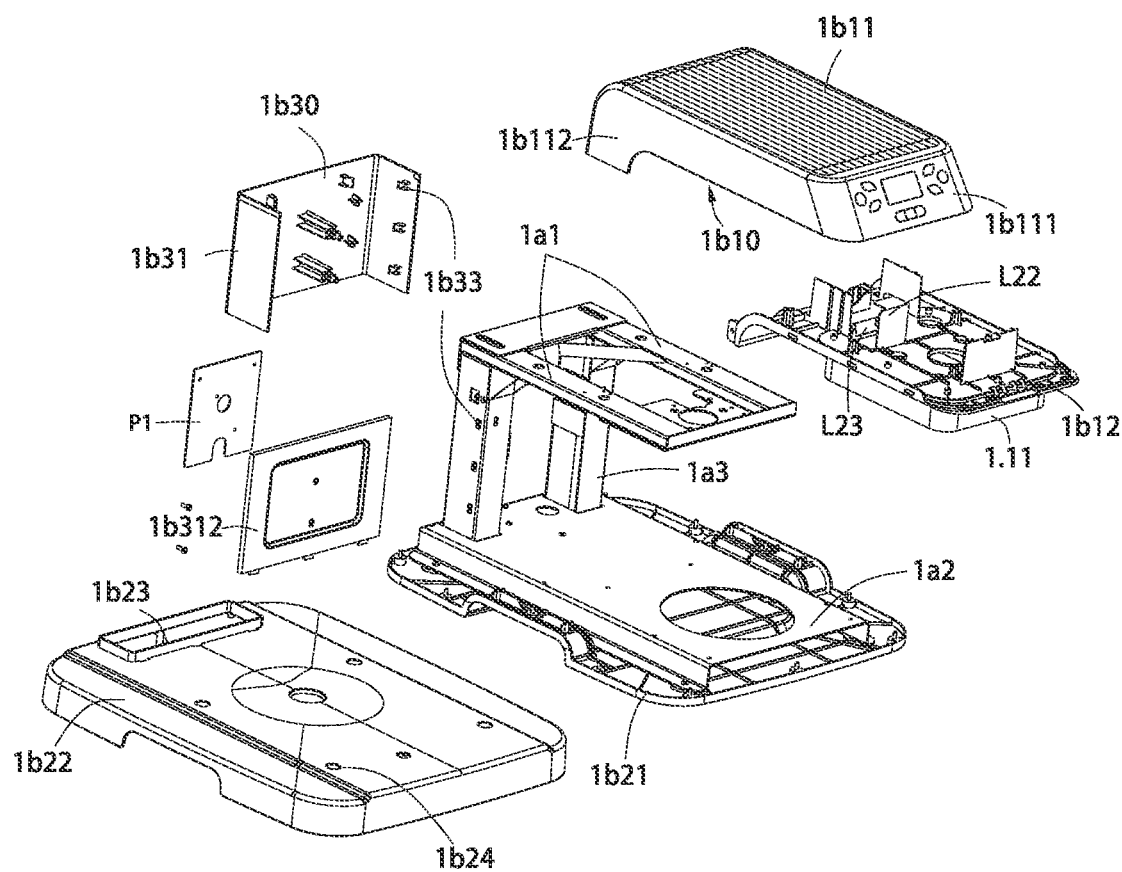
FIG. 7 is an exploded view of the metal bracket and shell cover.
Figure 8:
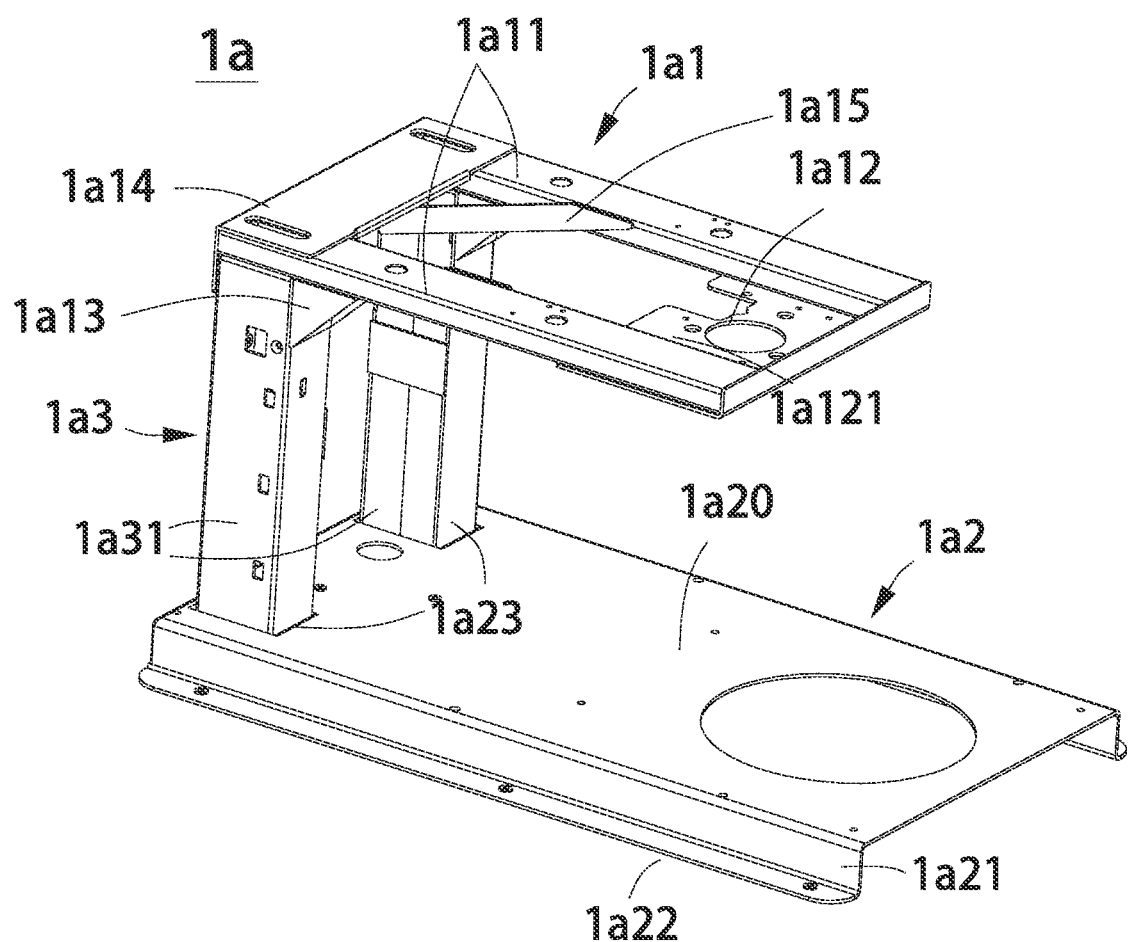
FIG. 8 is a three-dimensional schematic diagram of a metal bracket.
Figure 9:
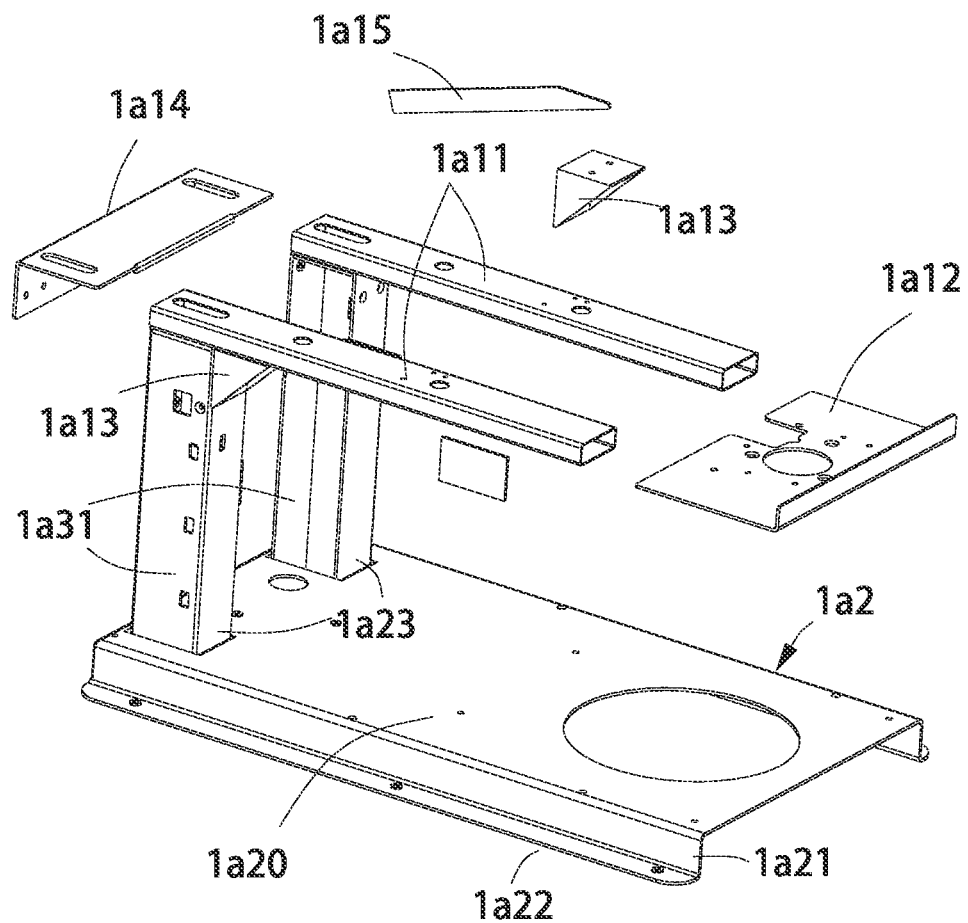
FIG. 9 is an exploded view of the metal bracket.
Figure 10:
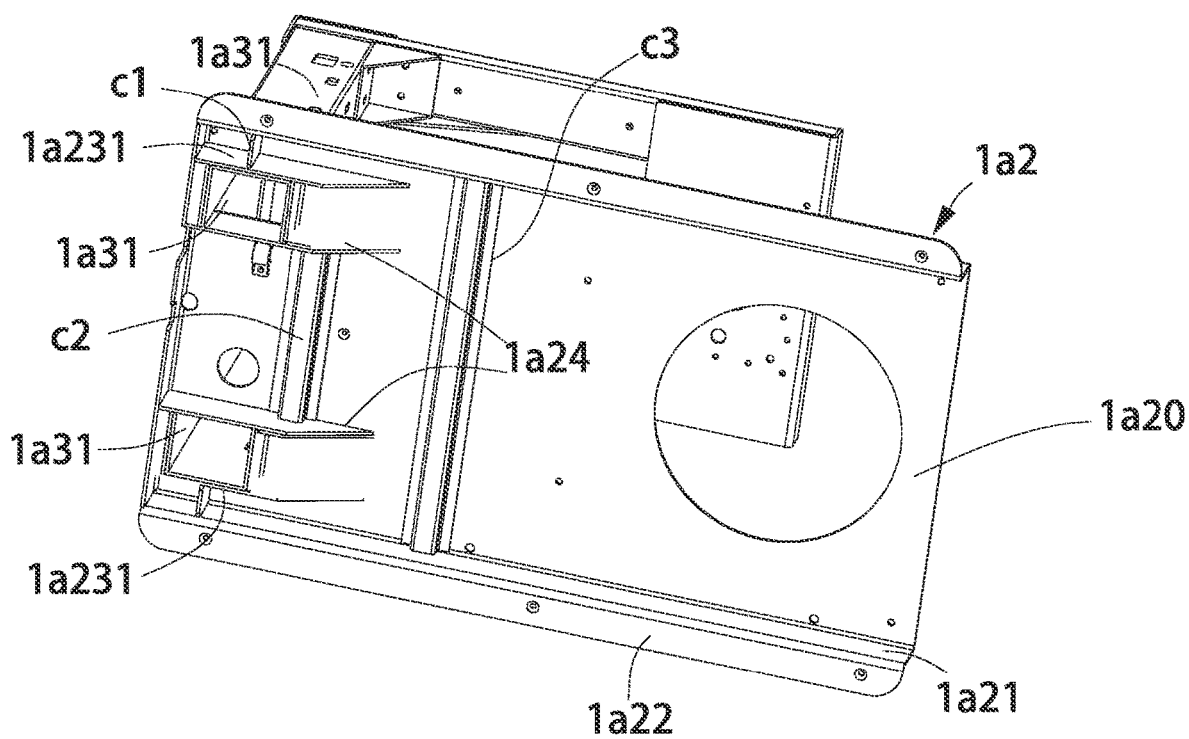
FIG. 10 is a schematic bottom view of the metal bracket.
Figure 11:
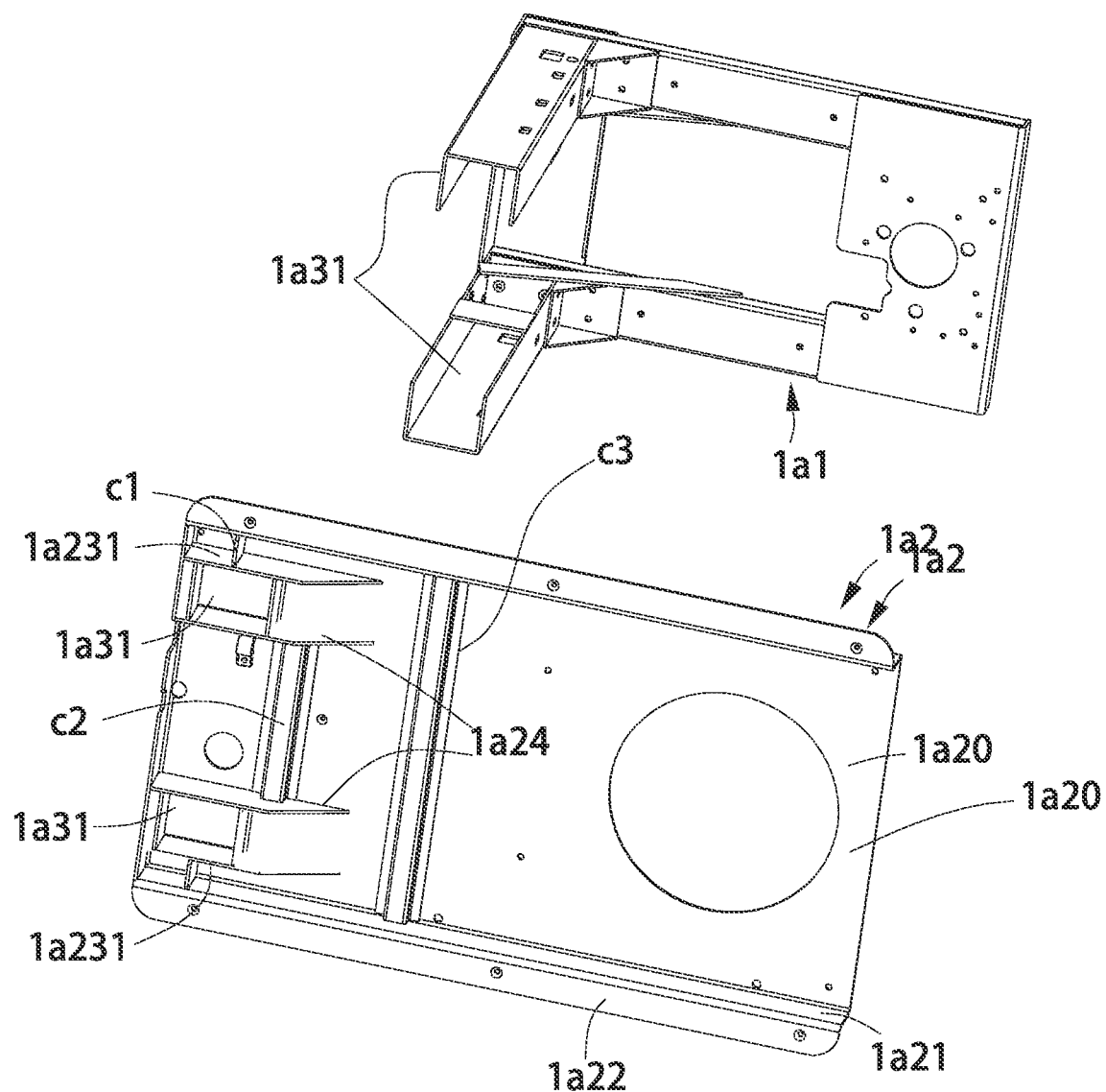
FIG. 11 is an exploded view from the bottom of the metal bracket.
Figure 12:
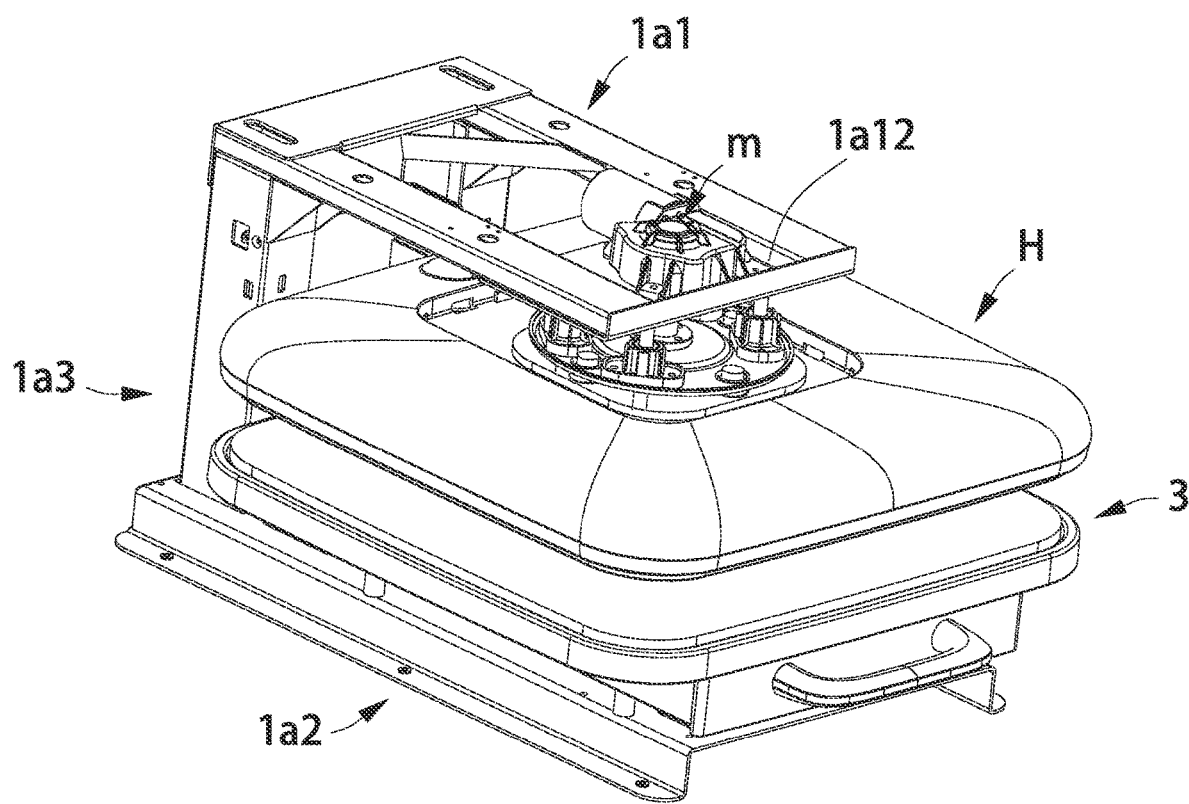
FIG. 12 is a three-dimensional schematic diagram of a metal bracket loaded with a heat pressing plate component.

Referring to FIG. 2, FIG. 4 and FIG. 7, in a preferred embodiment, a main control board P1 is arranged inside the side shell 1b3, and a control panel P2 is arranged at a front end of the upper shell 1b1 and is electrically connected with the main control board P1. Using the above scheme, the main control board P1 is placed inside the side shell 1b3, which can avoid the temperature transferred from the electric heating plate component H2 from the first heat dissipation channel L1, and reduce the influence of temperature on the main control board P1. The control panel P2 is arranged on the front end of the upper shell 1b1 at a relative distance from the first heat dissipation channel L1, and the influence of temperature is small. Of course, in order to reduce the influence of temperature on the control panel P2, some blocking walls can be arranged on the control panel P2 and the inner side. A control area e is provided on the front surface of the upper shell 1b1, and the control area e is provided with components for controlling the control panel P2, such as buttons.

The second heat dissipation channel L2 forms a communication port L23 at bottom of the upper shell 1b1 to communicate with the first heat dissipation channel L1, and a deflector L22 facing the heat dissipation outlet L21 is arranged at the communication port L23. The deflector is more favorable for the cooling airflow to flow to the heat dissipation outlet L21.

Figure 13:
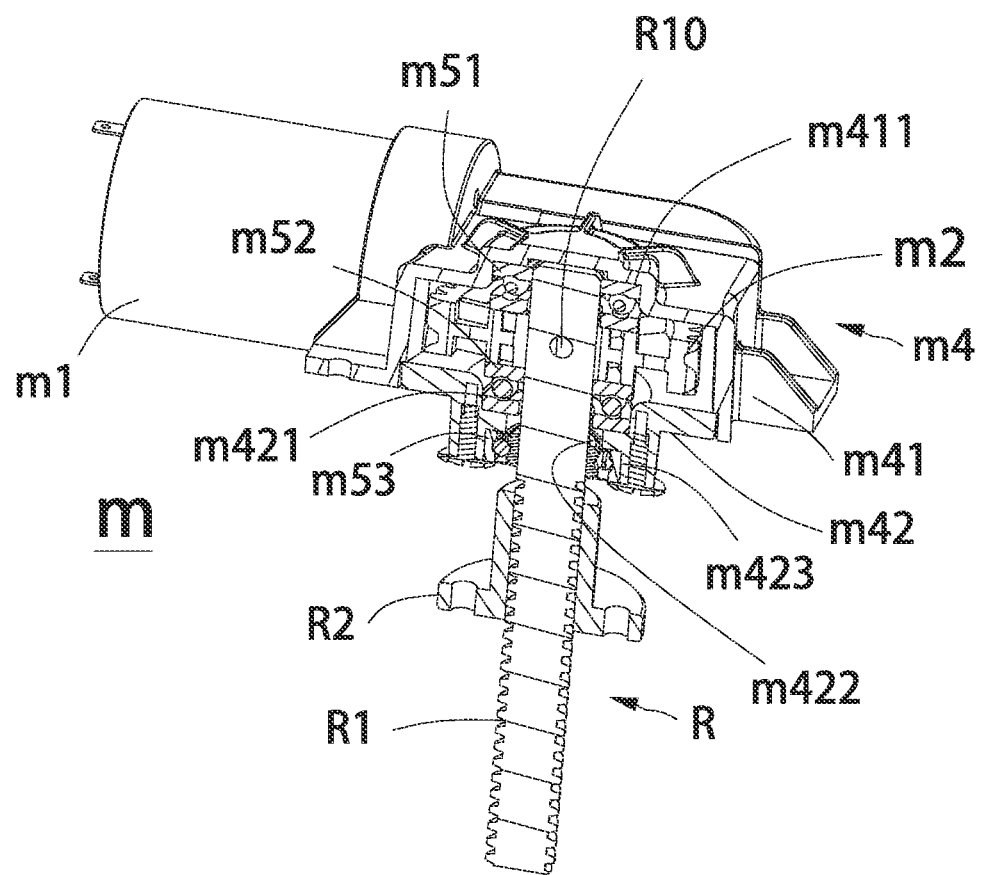
FIG. 13 is a three-dimensional sectional view of the drive mechanism.
Figure 14:
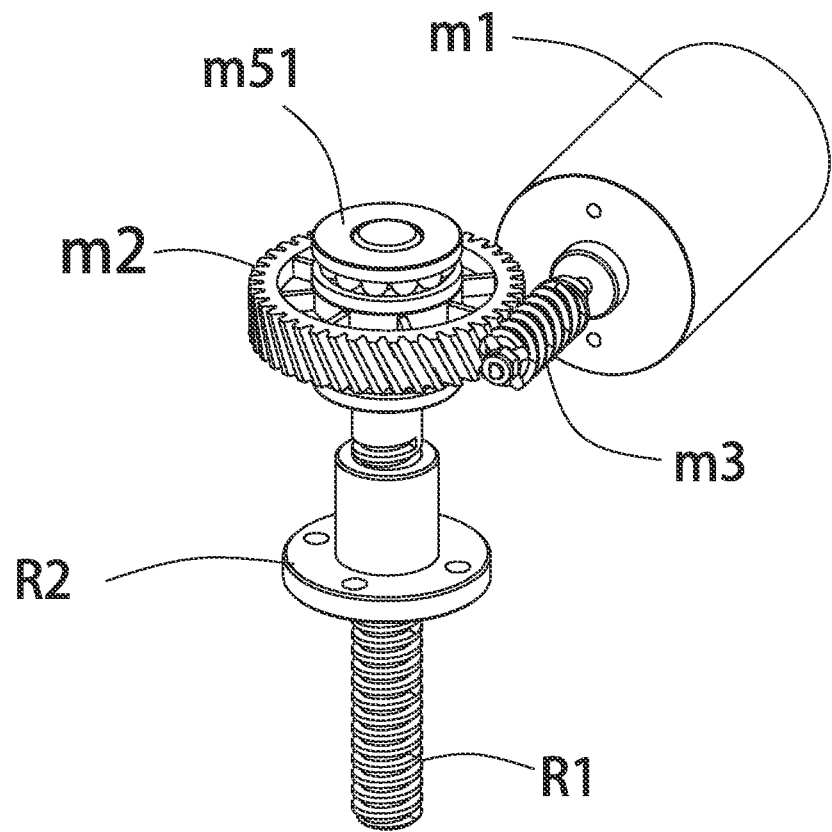
FIG. 14 is a partial perspective view of the drive mechanism.

Referring to FIG. 2, 13 and FIG. 14, in one embodiment, the drive mechanism m also comprises a gearbox m4, and the gearbox m4 is installed in the drive installation area 1.10. The upper end of the screw rod, the reduction gear m2 and the transmission gear member are installed in the gearbox m4. The motor m1 is fixedly connected to the gearbox m4. With the above structure, the overall volume of the drive mechanism m is smaller. The transmission gear member is a worm, and the reduction gear m2 is a worm wheel, so that the thickness of the drive mechanism m can be further reduced, thereby further reducing the thickness of the upper support 1.1.

In one embodiment, the gearbox m4 comprises a first case m41 and a second case m42 arranged up and down, the inner wall of the first case m41 is provided with a first bearing installation part m411, and the inner wall of the second case m42 is correspondingly provided with a second bearing installation part m421 and the screw rod hole m422 passing through the middle of the second bearing installation part m421. The upper end of the screw rod R1 passes through the upper side of the reduction gear m2, and the upper end of the screw rod R1 is located on the lower side of the reduction gear m2 and the lower side is respectively connected with the first plane bearing m51 and the second plane bearing m52. The first plane bearing m51 is mounted on the first bearing mounting portion m411, and the second plane bearing m52 is mounted on the second bearing mounting portion m421. The upper end of the screw rod R1 is assembled with the first case m41 and the second case m42 by using the first plane bearing m51 and the second plane bearing m52. The axial positioning of the screw rod R1 is realized by utilizing the axial support characteristics of the first plane bearing m51 and the second plane bearing m52 to assemble with the first bearing installation part m411 and the second bearing installation part m421. In this way, the common screw rod R1 can be used without machining an axial positioning structure on the screw rod R1, and the economy is better.

In order to maintain the concentricity of the screw rod R1, a radial bearing m53 is also installed at the lower part of the screw rod hole m422. The screw rod R1 is installed on the radial bearing m53, and the radial bearing m53 refers to a bearing that can maintain coaxiality, such as a roller bearing. In order to facilitate the installation of the radial bearing m53, a third bearing installation part m423 with a lower opening is provided at the lower part of the screw hole m422. The radial bearing m53 is installed in the third bearing installation part m423 and the lower side is fixed by screws.

In one embodiment, the reduction gear m2 is made of plastic and is fixed on the threaded rod R1 by injection molding. A pin hole R10 is provided at the part where the screw rod R1 is connected to the reduction gear m29, and a pin (not shown) is installed in the pin hole R10. Adopting this structure can make the injection molding connection between the reduction gear m29 and the screw rod R1 more stable.

Referring to FIG. 1 to 10, in one embodiment, the upper bracket 1a1 comprises two upper supporting arms 1a11 arranged side by side at intervals and a driving mounting part 1a12, the driving mounting part 1a12 connects the two upper supporting arms 1a11, and the drive mechanism m is installed on the driving mounting part 1a12, and the driving mounting part 1a12 is provided with a driving through hole 1a121. Adopting this structure can reduce the weight of the upper bracket 1a1 and ensure the structural rigidity, reducing the cost of materials.

Referring to FIG. 2, FIG. 8, FIG. 9 and FIG. 12, in one embodiment, the driving mounting part 1a12 is welded to the two upper supporting arms 1a11, of course, screw connection can also be used.

Referring to FIG. 2, FIG. 8, FIG. 9 and FIG. 12, in one embodiment, the side bracket 1a3 comprises two side columns 1a31 arranged at intervals, one end of each upper supporting arm 1a11 is connected to an upper end of a corresponding side column 1a31, and a lower end of each side column 1a31 is connected to the lower bracket 1a2. With this structure, the weight of the side column 1a31 can be reduced, and the structural rigidity can be ensured, and also the material cost can be reduced.

Referring to FIG. 7-10, in one embodiment, the connection between one end of the upper supporting arm 1a11 and the upper end of the corresponding side column 1a31 comprises at least one of the following: a triangular supporting connector 1a13 and corner connectors 1a14. The triangular supporting connector 1a31 connects a lower side of one end of each upper support arm 1a11 with an inner side of the upper end of the corresponding side column 1a31; A length of the corner connector 1a14 is adapted to a distance between the upper ends of the two side columns 1a3, and the two ends of the corner connectors 1a14 respectively enclose and connect the upper side of one end of each upper supporting arm 1a11 and the outer side of the upper end of the corresponding side column 1a31. In another embodiment, two corner connectors 1a14 are provided, which cover and connect the upper side of one end of each upper supporting arm 1a11 and the outer side of the upper end of the corresponding side column 1a31. With the above connection structure, due to the triangular stability of the triangular support connector 1a13 and the corner limit feature of the corner connector 1a14, the connection between the upper supporting arm 1a11 and the upper end of the side column 1a31 can be ensured to be stable and reliable.

In one embodiment, the corner connector 1a14 and the corresponding side column 1a31 are fixed by welding, which can ensure the stability of the connection with the side column 1a31. For the convenience of welding the corner connector 1a14 and the corresponding side column 1a31 can be pre-positioned by screws.

Under the condition that the force is satisfied, the corner connector 1a14 and the corresponding side column 1a31 can also be connected only by screws, and the main factors to be considered include the size, weight and pressure of the heat pressing plate component H of the product.

The triangular support connector 113 is preferably connected by screws, which facilitates the connection and disassembly of the upper bracket 1a1 and the side column 1a31. For the stability of the connection, welding aids can also be added, or only connected by welding.

It also comprises two cable-stayed members 1a15, one end of the cable-stayed members 1a15 is connected to the upper end of the side column 1a31 downward at a preset height. The preset height can be determined according to the needs of the main design, for example, at a position of 2-5 cm downward, and the other end is connected to the upper supporting arm 1a11 at a position more than ⅓ from the inner end. It is better not to be within ½, which can not only ensure the stability, but also avoid occupying too much space and increase the size of the upper shell 1b1.

Referring to FIG. 7-11, in one embodiment, the lower bracket 1a2 comprises a supporting surface 1a20, supporting side walls 1a21 extending downward from at least two opposite sides of the supporting surface 1a20, and a supporting connecting part 1a22 formed at a lower end of the supporting side wall 1a21 and connected to a bottom wall of the lower shell 1b2; the supporting surface 1a20 is provided with column sockets 1a23 corresponding to the lower ends of the two side columns 1a31, and the lower ends of the two side columns 1a31 are inserted into the corresponding column sockets 1a23 with limited angular fit and fixedly connected with the lower bracket 1a2. The lower bracket 1a2 adopts the above-mentioned structure, which can reduce the weight of the material while ensuring the structural strength, and at the same time reasonably use the space formed under the supporting surface 1a20 to provide a space for the connection of the lower ends of the two side columns 1a31, so that the product structure is more compact. The column sockets 1a23 make the installation of the two side columns 1a31 quick and easy.

The lower side of the column insertion hole 1a23 is configured with a lateral limiting structure for laterally limiting the lower end of the side column 1a31. Due to the limited thickness of the supporting surface 1a20, the lateral limiting structure can prevent the lateral instability of the two side columns 1a31 due to the small contact surface between the column sockets 1a23 and the two side columns 1a31. Of course, under the condition of not affecting the assembly, the lateral limiting structure can also be arranged on the upper side of the column sockets 1a23.

One solution of the lateral limiting structure is the extension wall 1a231, that is, the convex wall.

In one embodiment, the lower ends of the two side columns 1a31 and the lower side of the lower bracket 1a2 are connected by welding, so that the connection between the two is more stable. In order to strengthen the connection, a reinforcing connecting piece 1a24 is arranged between the lower ends of the two side columns 1a31 and the lower side of the lower bracket 1a2.

The lower bracket 1a2 is also provided with the following reinforcement structure, a reinforcing bar c1, connected between the lateral limit structure 1a231 of the two column sockets 1a23 and the supporting side wall 1a21; a reinforcing bar c2, connected between the lateral limit structures 1a23 of the two column sockets 1a23; a reinforcing bar c3, connected between the two supporting side walls 1a21.

By adopting the above-mentioned reinforcing structure, the structural stability of the lower bracket 1a2 and the stability of the connection between the lower bracket 1a2 and the two side columns 1a31 can be further effectively improved.

Referring to FIG. 1 to 8, in one embodiment, the upper shell 1b1 comprises a top case 1b1l and a top case lower cover 1b12. The upper shell 1b11 comprises a first shell end 1b11 extending to the front end of the upper bracket 1a1 and a second shell end 1b112 with a bent portion extending to enclose and connect the upper part of the side bracket 1a3. Between the first shell end 1b111 and the second shell end 1b112, an upper accommodating bracket 1a1 with a lower side opening and an upper shell chamber 1b10 above the side bracket 1a3 are formed. The top case lower cover 1b12 covers the lower side of the upper case chamber 1b10, and the first end of the top case lower cover 1b12 is connected to the first shell end 1b111. The second end of the top case lower cover 1b12 is connected with the side bracket 1a3, and the top case lower cover 112 is connected with the upper bracket 1a1 by screws. The upper shell b11 adopts the above structure, which can make the connection between the upper shell 1b11 and the top case lower cover 1b12 stable and beautiful.

Referring to FIG. 1 to 8, the side shell 1b3 comprises a side shell main body 1b31 joined to the upper shell 1b11 and a side shell cover 1b32 joined to the top case lower cover 1b12. The side shell main body 1b31 is formed with a side shell chamber 1b30 having a side opening for accommodating the side bracket 1a3. The side shell main body 1b31 is designed with a fastening structure 1b33 on the vertical sides of the shell wall and the side bracket 1a3. The side shell cover 1b32 covers the side opening of the side shell chamber 1b30 and is connected to the side shell main body 1b31 through a connecting element. The side shell 1b3 adopts the above-mentioned structure to facilitate installation, and at the same time, the side shell main body 1b31 and the side bracket 1a3 are connected through the fastening structure 1b33, so the connection is stable and the installation is quick.

Referring to FIG. 1 to FIG. 8, the lower shell 1b2 comprises the lower shell base part 1b21 and the lower shell upper cover 1b22, the lower bracket 1a2 is installed on the lower shell base part 1b21, and the lower shell upper cover 1b22 is arranged on the lower shell base part 1b21. On the upper side, the upper cover 1b22 of the lower shell is provided with a side bracket connection hole 1b23 and a supporting seat connection hole 1b24.

In one embodiment, extraction recesses 1b20 are formed on the laterally opposite sides of the lower shell base part 1b21. The above-mentioned structure is designed to facilitate picking and placing of equipment.

Figure 15:
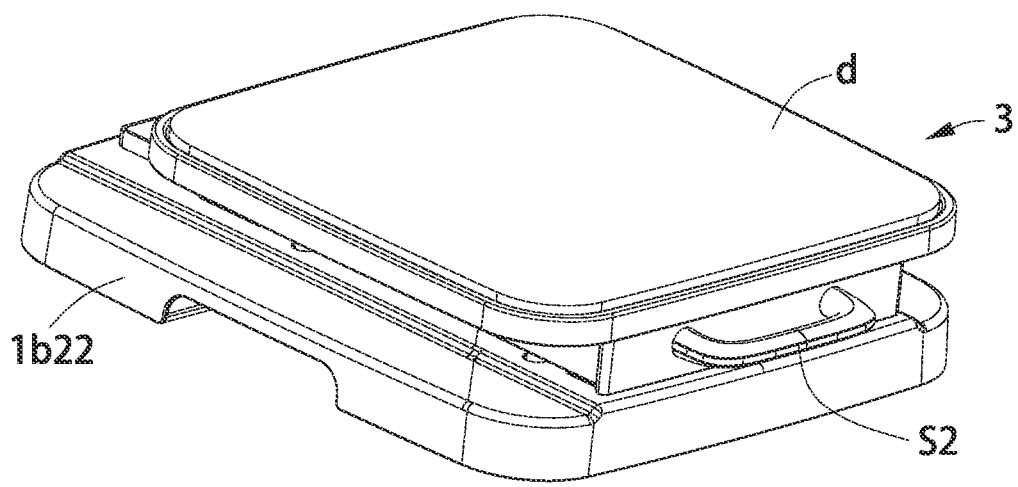
FIG. 15 is a schematic perspective view of the lower shell, the lower bracket and the supporting seat.
Figure 16:
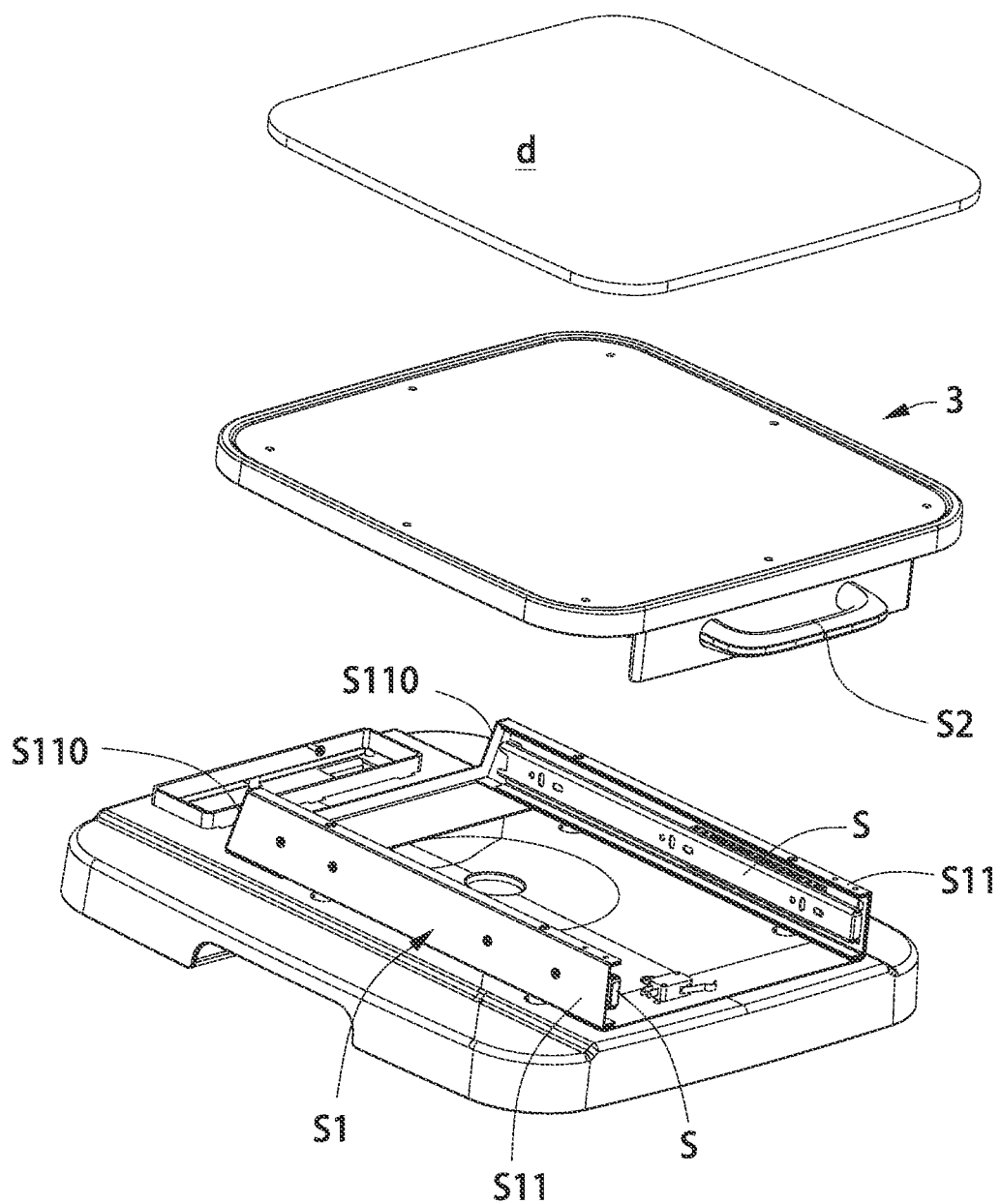
FIG. 16 is an exploded view of the lower shell, lower bracket and the supporting seat.

Referring to FIG. 15 and FIG. 16, in one embodiment, it also includes a guide rail connection mechanism S1 connecting the supporting seat 3 and the lower bracket 1a2, which includes a guide rail connection part S11 for installing two guide rail devices S arranged oppositely. The inner end of the guide rail connection part S11 is provided with an inclined surface structure S110 along the upper side outward, and guide rail devices S are installed on the opposite sides of the two guide rail connection parts S11. The supporting seat 3 is connected to the guide rail device S, and a handle S2 is provided on the front side of the supporting seat 3. Such a structure is convenient for the user to manipulate the supporting seat 3, and at the same time, the force of the supporting seat 3 can be effectively transmitted to the lower bracket 1a2 through the rail connection mechanism S1.

In one embodiment, the rail connection mechanism S1 is a metal frame.

According to the disclosure and teaching of the above specification, those skilled in the art to which the present application belongs may also make changes and modifications to the above implementation manners. The present application is not limited to the specific embodiments disclosed and described above, and some modifications and changes to the present application should also fall within the protection scope of the claims of the present application.

What is claimed is:

1. An automatic pressure heat transfer printing machine comprising:
    a machine body, comprising a metal bracket and a shell cover, the metal bracket comprises: an upper bracket and a lower bracket arranged up and down at intervals, and a side bracket connecting the same side end of the upper bracket and the lower bracket; the shell cover comprises an upper shell enclosing the upper bracket, a lower shell enclosing the lower bracket, and a side shell enclosing the side bracket;
    a drive mechanism, comprising a drive speed change device arranged on the upper bracket, and a screw nut pair extending downwards, an upper end of the screw nut pair is in transmission connection with an output end of the drive speed change device;
    a heat pressing plate component, arranged under the upper shell, comprising a plastic shell, a connecting member, an electric heating plate component and a plurality of elastic connecting devices, a middle part of the connecting member is fixedly connected with a screw nut of the screw nut pair, and the connecting member is connected with the electric heating plate component by the plurality of elastic connecting devices; the plastic shell encloses an upper part of the electric heating plate component, and an upper side of the plastic shell is provided with a lower surrounding wall surrounding outside of the connecting member, and a lower side of the upper shell is provided with an upper surrounding wall that is movably fitted with the lower surrounding wall;
    a supporting seat, supported on the lower bracket, is configured to provide support for a heat transfer object;
    a heat dissipation mechanism, comprising: a first heat dissipation channel enclosed by the lower surrounding wall and the upper surrounding wall, the first heat dissipation channel communicates with inside of the heat pressing plate component; a second heat dissipation channel formed inside the upper shell and connected to the first heat dissipation channel; a fan arranged in the second heat dissipation channel for generating heat dissipation airflow.

2. The automatic pressure heat transfer printing machine according to claim 1, wherein further comprising a heat dissipation outlet communicating with the second heat dissipation channel, and the fan is arranged at a heat dissipation outlet.

3. The automatic pressure heat transfer printing machine according to claim 2, wherein the second heat dissipation channel forms a communication port at bottom of the upper shell to communicate with the first heat dissipation channel, and a deflector facing the heat dissipation outlet is arranged at the communication port.

4. The automatic pressure heat transfer printing machine according to claim 2, wherein the heat dissipation outlet is arranged on one end of the lower side of the upper shell close to the side shell.

5. The automatic pressure heat transfer printing machine according to claim 1, wherein a main control board is arranged inside the side shell, and a control panel is arranged at a front end of the upper shell and is electrically connected with the main control board.

6. The automatic pressure heat transfer printing machine according to claim 1, wherein the electric heating plate component comprises a heat-generating base, a non-metallic base cover connected to an upper side of the heat-generating base, at least one layer of heat insulating material arranged between the non-metallic base cover and the heat-generating base, and an edge of the non-metallic base cover is extended to form an edge of the heat-generating base, and an edge of the plastic shell is connected to the edge of the non-metallic base cover.

7. The automatic pressure heat transfer printing machine according to claim 1, wherein the upper bracket comprises two upper supporting arms arranged side by side at intervals and a driving mounting part, the driving mounting part connects the two upper supporting arms, and the drive speed change device is arranged on the driving mounting part; or the side bracket comprises two side columns arranged at intervals, one end of each upper supporting arm is connected to an upper end of a corresponding side column, and a lower end of each side column is connected to the lower bracket.

8. The automatic pressure heat transfer printing machine according to claim 7, wherein the connection between one end of the upper supporting arm and the upper end of the corresponding side column comprises at least one of the following:
    a triangular supporting connector connecting a lower side of one end of each upper support arm with an inner side of the upper end of the corresponding side column;
    corner connectors, a length of which is adapted to a distance between the upper ends of the two side columns, and the two ends of the corner connectors respectively enclose and connect the upper side of one end of each upper supporting arm and the outer side of the upper end of the corresponding side column; or, two corner connectors are provided, which cover and connect the upper side of one end of each upper supporting arm and the outer side of the upper end of the corresponding side column;
    two cable-stayed members, one end of the cable-stayed member is connected to the upper end of the side column at a preset height downward, and the other end is connected to a position more than ⅓ from an inner end of the upper supporting arm;
    With the above connection structure, due to a triangular stability of the triangular supporting connector and the two cable-stayed members, and a corner limit feature of the corner connectors, a connection between the upper supporting arm and the upper end of the side column can be ensured to be stable and reliable.

9. The automatic pressure heat transfer printing machine according to claim 8, wherein the lower bracket comprises a supporting surface, supporting side walls extending downward from at least two opposite sides of the supporting surface, and a supporting connecting part formed at a lower end of the supporting side wall and connected to a bottom wall of the lower shell; the supporting surface is provided with column sockets corresponding to the lower ends of the two side columns, and the lower ends of the two side columns are inserted into the corresponding column sockets with limited angular fit and fixedly connected with the lower bracket.

10. The automatic pressure heat transfer printing machine according to claim 9, wherein the lower side of the column socket is provided with a lateral limit structure for laterally limiting the lower end of the side column, and also comprises one of the following reinforcement structures:
- a reinforcing bar, connected between the lateral limit structure of the two column sockets and the supporting side wall;
- a reinforcing bar, connected between the lateral limit structures of the two column sockets;
- a reinforcing bar, connected between the two supporting side walls.

* * * * *